United States Patent Office 3,354,728
Patented Nov. 28, 1967

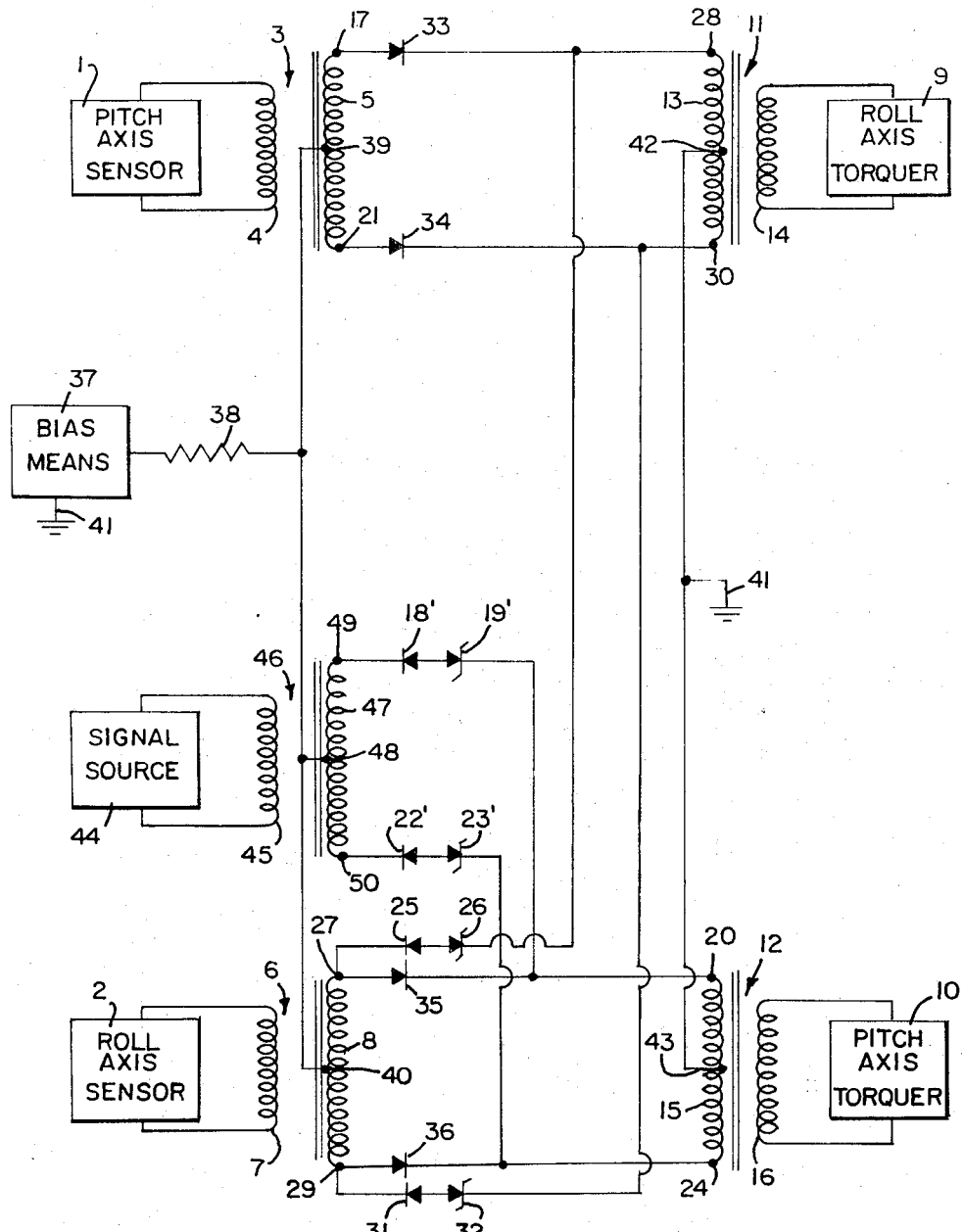

3,354,728
SEMICONDUCTOR TRANSFER CIRCUIT
Gerald L. Sullivan, Georgetown, Mass., assignor to General Electric Company, a corporation of New York
Filed May 17, 1965, Ser. No. 456,302
12 Claims. (Cl. 74—5.47)

My invention relates to transfer control circuits and, more specifically, to gyro erection cycle transfer circuits.

My invention is useful in a signal transfer system in which it is desirable to controllably couple signals between a plurality of signal sources and a plurality of signal responsive means.

My invention is particularly useful in a gyro system in which the direction of a gyro spin axis or the orientation of a gyroscopically stabilized platform is corrected during normal operation of the system to correspond with a reference direction determined by a gravitational device or other sensor. Gyro systems of this type include platforms and vertical gyros which are gyroscopically stabilized in a plane having a predetermined relationship to the reference direction. A number of sensors are attached to the gyro gimbals to generate signals corresponding to the deviation of the platform or the gyro spin axis from the reference direction. The signals from these sensors are coupled to torque motors or torquers responsive thereto which are connected to the gimbals to erect the gyro with respect to the reference direction. That is, the combination of the sensors and the torquers maintain the gyro in a predetermined direction by correcting any change of the gyro from that direction.

During the normal operation of the gyro, when the rotating mass of the gyro is spinning rapidly so as to have a high angular momentum, the gyro tends to react to a gimbal axis disturbing torque by precessing, i.e., rotating about the axis at right angles to the axis of the applied torque. Thus, when a sensor senses that a gimbal has deviated from a plane defined by the reference direction, it must transmit its signals to a torquer which corrects for the deviation by applying a torque about a gimbal axis which is at right angles to the axis of deviation. This is called precession erection of the gyro.

During the initial start-up period of the gyro, there is a short interval of time during which either the gyro is not in motion or its spin rate is so slow that its angular momentum is negligible. Thus, a disturbing torque applied at one of the axes of the gyro does not cause precession of the gyro but rather results in a motion about the axis of the torque. Therefore, during the initial start-up period or at any time when the angular momentum of the gyro is very small, an erection torque must be applied about the axis of the deviation. This operation is called a direct erection of the gyro.

Gyro systems of this type have a transfer circuit which can establish either a direct erection mode or a precession erection mode in accordance with the needs of the gyro. For example, in a vertical gyro system the gyro is kept erect by means of a pitch axis torquer which applies torque about the pitch axis of the gimbaling system and a roll axis torquer which applies torque about the roll axis of the gimbaling system. A pitch axis sensor generates a signal corresponding to the deviation of the gyro about the pitch axis. A roll axis sensor generates a signal corresponding to the deviation of the gyro about the roll axis. During the direct erection mode, the transfer circuit connects the output from the pitch axis sensor to the pitch axis torquer and the output from the roll axis sensor to the roll axis torquer. However, during the precession erection mode of the gyro, the transfer circuit connects the output from the pitch axis sensor to the roll axis torquer, and the roll axis sensor to the pitch axis torquer.

Prior art gyro systems have used a number of double-throw, mechanical switches to facilitate a transfer between the direct erection cycle and the precession erection cycle of the gyro. These mechanical switches may be solenoid operated in response to a control circuit which determines when a transfer in the erection cycle should occur. It has been found that transfer circuits using these mechanical switches are bulky and heavy due to the size of the switching apparatus. In applications of the gyro system where it is used for aircraft flight control, the added size and weight of these transfer circuits is obviously a disadvantage since it limits the size and weight of other apparatus which can be carried by the aircraft. It is advantageous to mount the transfer circuit on the gimbals themselves to minimize the number of electrical connections leaving and re-entering the gimbaling system. However, it is difficult to mount the mechanical switches thereon because there is a transfer in the mass of the switches when they operate which results in a change of balance of the gimbals on which they are mounted which degrades performance of the gyro. Furthermore, these transfer circuits may be subject to mechanical malfunction which necessitates added maintenance and repair of the gyro system.

It is an object of my invention to provide an improved, compact, light-weight transfer circuit.

It is an object of my invention to provide an improved transfer circuit for the erection cycle of a gyro system which eliminates mechanical switches.

It is another object of my invention to provide an improved transfer circuit for a gyro system which facilitates its mounting on the gyro gimbals without adverse effects on the performance of the gyro.

It is a further object of my invention to provide a transfer circuit for a gyro system which utilizes solid state devices and therefore diminishes the need for maintenance and repair of the system.

Briefly stated, and in accordance with one aspect of my invention, I provide a circuit for transferring between the erection modes of a gyro system as described above. This circuit includes a first circuit means having a number of semiconductor switching means for interconnecting the signal sources and the torquers to set up precession erection of the gyro. It further includes a second circuit means having a number of semiconductor switching means for interconnecting the signal sources and the torquers to set up direct erection of the gyro. The transfer circuit also includes a means for determining which of the erection modes of the gyro will be effected.

While the specification concludes with claims particularly pointing out and distinctly claiming the subject matter which I regard as my invention, it is believed the invention will be better understood from the following description taken in connection with the accompanying drawings in which:

FIGURE 2 is a schematic diagram of another embodiment of my invention.

Figure 1:
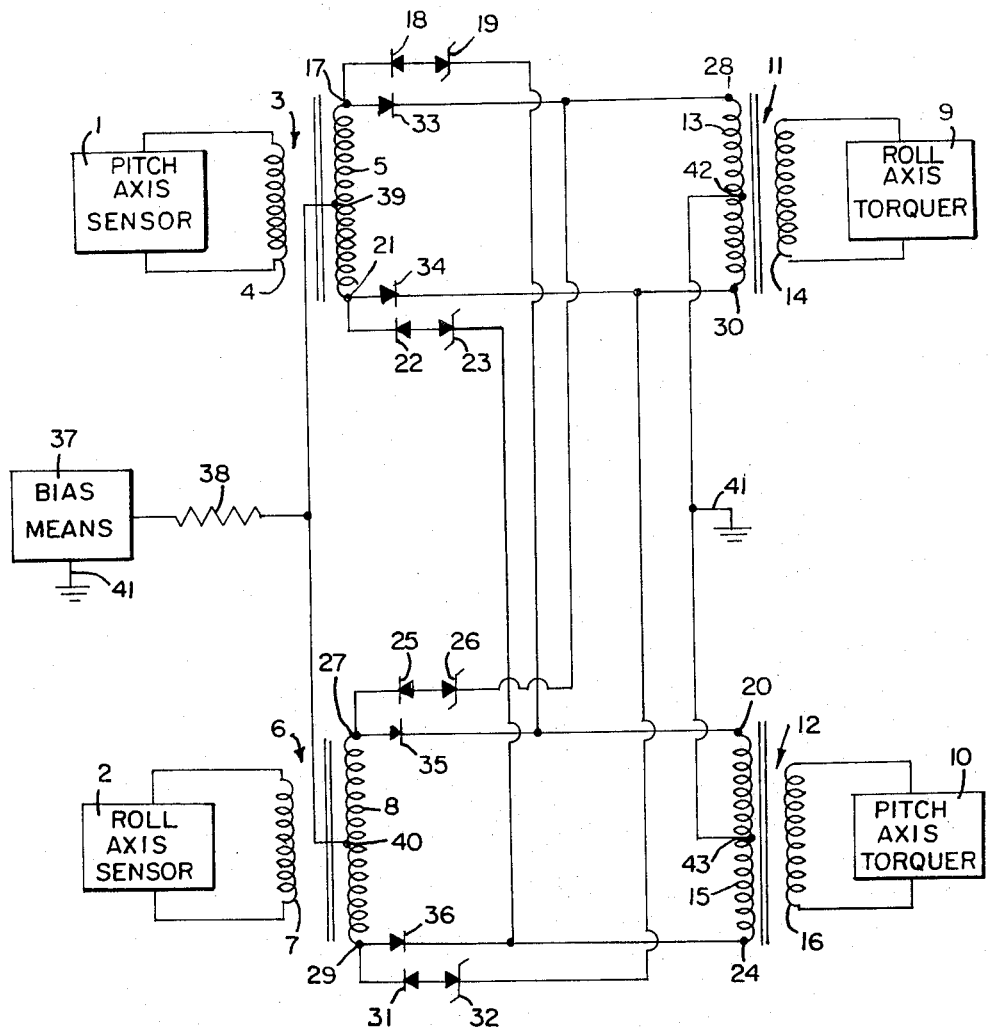
FIGURE 1 is a schematic diagram of one embodiment of my invention.

A transfer circuit for setting up either a precession erection mode or a direct erection mode of a gyro is shown in FIGURE 1. This preferred embodiment of my invention is described with reference to a vertical gyro system.

Signal sources which are responsive to the position of the axes of the gyro with respect to a reference direction may comprise gravitationally responsive pitch axis sensor 1 and roll axis sensor 2. The signals are coupled from the sensors 1 and 2 by means of a transformer 3, having a primary winding 4 and a secondary winding 5, and a transformer 6, having a primary winding 7 and a secondary winding 8, respectively.

A pair of torque motors is coupled to a gyro to erect the gyro in response to signals from the sensors 1 and 2. The torque motors comprise a roll axis torquer 9 and a pitch axis torquer 10. Signals are coupled to the torquers 9 and 10 through transformers 11 and 12, respectively. The transformer 11 has a primary winding 13 and a secondary winding 14, and the transformer 12 has a primary winding 15 and a secondary winding 16 which is connected to the torquer 10.

To set up a direct erection mode of the illustrated gyro system, signals must be transferred from the pitch axis sensor 1 to the pitch axis torquer 10 and from the roll axis sensor 2 to the roll axis torquer 9. In accordance with the invention, these signals may be coupled from the pitch axis sensor 1 through a terminal 17 of the secondary winding 5 and applied to the cathode of a diode 18 and the anode of a zener diode 19 to a terminal 20 of the winding 15 at the pitch axis torquer. They are further coupled from a terminal 21 of the winding 5 and applied to the cathode of the diode 22 and the anode of a zener diode 23 to a terminal 24 of the winding 15. Direct erection mode signals may also be coupled from the roll axis sensor 2 to the roll axis torquer 9 applied to the cathode of a diode 25 and the anode of a zener diode 26 which are connected between a terminal 27 of the winding 8 and a terminal 28 of the winding 13. Such signals are further coupled between a terminal 29 of the winding 8 and a terminal 30 of the winding 13 applied to the cathode of the diode 31 and the anode of a zener diode 32.

A circuit which sets up a precession erection mode of the gyro system must couple signals from the pitch axis sensor 1 to the roll axis torquer 9 and must couple signals from the roll axis sensor 2 to the pitch axis torquer 10. Semiconductor switching means for coupling signals from the pitch axis sensor to the roll axis torquer comprise a diode 33 having its anode connected to the terminal 17 and its cathode connected to the terminal 28 and a diode 34 having its anode connected to the terminal 21 and its cathode connected to the terminal 30. A semiconductor switching means for coupling signals between the roll axis sensor 2 and the pitch axis torquer 10 include a diode 35 having signals coupled through its anode from the terminal 27 to the terminal 20 and a diode 36 having signals coupled from the terminal 29 and through its anode to the terminal 24.

To enable the semiconductor diodes to set up and transfer between the direct erection mode and the precession erection mode, a transfer control or biasing means 37 is connected through a resistor 38 to center taps 39 and 40 of the secondary windings 5 and 8, respectively. The biasing means 37 is further connected through a return bus 41 to center taps 42 and 43 of the primary windings 13 and 15, respectively. This biasing means may include a control apparatus which senses the need for a change in the erection cycle of the gyro and changes the potential at the biasing means accordingly.

The zener diodes 19, 23, 26, and 32 develop a sizable blocking voltage across the diodes 33–36 when the center taps 39 and 40 are negative in potential with respect to the center taps 42 and 43. The blocking voltage thus is selected to be larger than the largest signal of positive polarity which can be expected to be generated by the sensors 1 and 2 so that the diodes 33–36 will not conduct during the direct erection mode of the gyro. Furthermore, during a precession erection mode of the gyro, when the center taps 39 and 40 are positive in potential with respect to the center taps 42 and 43, the series connection of the standard diodes and the zener diodes prevents the occurrence of a direct erection mode. For example, considering the diodes 18 and 19, the diode 18 blocks positive signals from the terminal 17 and the diode 19 blocks negative signals from the terminal 17 which are below its zener breakdown voltage level.

While the preferred embodiment of my invention shows the biasing means 37 connected to the center of the transformer windings 5, 8, 13, and 15, this type of connection is used only when it is desired to have a balanced D-C effect in the transformer windings. For some applications of my invention, this may not be advantageous, particularly since this double-ended type of circuit requires twice the number of diodes and zener diodes that an alternative single-ended circuit would use. To convert to a single-ended circuit, it is necessary only to delete the lower halves of each transformer and the associated diodes and zener diodes.

When the angular momentum of the rotating mass of the gyro becomes larger so that precession of the gyro begins to occur, the biasing means sets up a precession erection cycle of the gyro by applying a positive potential at the center taps 39 and 40 with respect to the center taps 42 and 43. The positive potential at the center tap 39 with respect to the center tap 42 tends to forward bias the diodes 33 and 34, while the positive potential at the center tap 40 with respect to the center tap 43 tends to forward bias the diodes 35 and 36. This potential reverse biases the diodes 18, 19, 25, and 31. Therefore, signals are transmitted from the pitch axis sensor 1 to roll axis torquer 9 and from the roll axis sensor 2 to the pitch axis torquer 10 to effect precession erection of the gyro.

During the operation of the gyro system, the sensors 1 and 2 generate signals corresponding to the deviation of the position of the gyro spin axis to correspond to the reference direction. The signals from the pitch axis sensor 1 are transmitted from the primary winding 4 to the secondary winding 5, and the signals from the roll axis sensor 2 are transmitted from the primary winding 7 to the secondary winding 8. During the initial start-up period of the gyro system when either the gyro is not in motion or the angular momentum of its rotating mass is small, the biasing means 41 sets up a direct erection mode of the gyro system by applying a negative potential at the center taps 39 and 40 with respect to that at the center taps 42 and 43. The negative potential at the center tap 39 with respect to the center tap 43 tends to forward bias the diodes 18 and 22 and reverse bias the diodes 33 and 34. When the difference in potential between the center points 39 and 43 is in excess of the zener breakdown voltage levels of the zener diodes 19 and 23, signals are transmitted from the pitch axis sensor 1 to the pitch axis torquer 10. Similarly, the negative potential at the center tap 40 with respect to the center tap 42 tends to forward bias the diodes 25 and 31. When the potential is in excess of the zener breakdown voltage levels of the zener diodes 26 and 32, signals are transmitted from the roll axis sensor 2 to the roll axis torquer 9. This voltage reverse biases the diodes 33 and 34 to isolate the pitch axis sensor 1 from the roll axis torquer 9 and reverse biases the diodes 35 and 36 to isolate the roll axis sensor 2 from the pitch axis torquer 10.

In a second embodiment of my invention shown in FIGURE 2, circuit components corresponding to those described in FIGURE 1 are identically numbered. The second embodiment of my invention uses the same precession erection circuit as was shown in FIGURE 1. However, for some applications of my invention where the pitch axis sensor 1 and the roll axis sensor 2 are gravity sensors, the effects of accelerations on these sensors may reduce their value during a direct erection mode. Therefore, it may be desirable to transfer to a different signal source to indicate the deviation of one or both axes from the reference plane during the direct erection mode. For example, in the embodiment shown in FIGURE 2, the pitch axis sensor 1 is disconnected from the direct erection circuit; and another signal source, which generates a signal derived from the angular relationship between pitch and roll gimbals, is substituted in its place. In this circuit a signal is transferred from a signal source 44, responsive to the aforementioned angular relationship, and through a primary winding 45 of a transformer 46 and to a secondary winding 47 having a center tap 48 and terminals 49 and 50. The biasing means 37 is connected through the resistors 38 to the center tap 48 of the secondary winding 47. When the potential at the biasing means 37 is such that the center tap 48 is negative with respect to the center tap 43 and the center tap 40 is negative with respect to the center tap 42, a direct erection mode of the gyro can be effected. At this time signals are coupled from the signal source 44 and through the terminal 49 of the transformer 46 and the cathode of the diode 18' and the anode of the zener diode 19' to the terminal 20 of the transformer 12 and thus to the pitch axis torquer. They are also coupled from the terminal 50 of the transformer 46 and through the cathode of the diode 22' and the anode of the zener diode 23' to the terminal 24 of the transformer 12 and thus to the pitch axis torquer 10. Of course, the biasing means 37 must raise the potential across the zener diodes 19' and 23' so that the signals from the signal source 44 are above the zener breakdown voltage level before a direct erection mode can be effected. During this direct erection mode, signals are coupled from the roll axis sensor 2 to the roll axis torquer 9 in a manner similar to that described above with respect to the circuits shown in FIGURE 1. Furthermore, the precession erection mode of of the gyro system shown in FIGURE 2 is initiated in a manner similar to that shown with respect to the gyro system shown in FIGURE 1.

My invention is not limited by the embodiments shown herein or to the specific apparatus discussed above. To the contrary, my invention is capable of numerous modifications, as will be recognized by those skilled in the art, without deviating from the scope thereof and should not be limited in any sense except as defined by the following claims.

What I claim as new and desire to secure by Letters Patent of the United States is:

1. In a gyro system having a plurality of electrical torquers for erecting a gyro, a plurality of signal sources responsive to the position of the axes of the gyro with respect to a reference direction for controlling said torquers, first circuit means for interconnecting said sources and said torquers to cause precession erection of the gyro, second circuit means for interconnecting said sources and said torquers to cause direct erection of the gyro, the improvement comprising:
   (a) said first and second circuit means including semiconductor switching means, and
   (b) transfer control means connected to said semiconductor switching means so that when the output of said transfer control means is of one character, a precession erection of the gyro can be effected and when the output of said transfer control means is of another character, a direct erection of the gyro can be effected.

2. A gyro system according to claim 1 wherein:
   (a) said first circuit means includes a plurality of semiconductor diodes which can conduct current to cause a precession erection of the gyro when said transfer control means maintains a first potential, and
   (b) said second circuit means includes a plurality of semiconductor diodes which can conduct current to cause a direct erection of the gyro when said transfer control means maintains a second potential.

3. A gyro system according to claim 2 wherein one of said first and second circuit means includes zener diodes, each of said zener diodes connected in series with another of said semiconductor diodes to develop a blocking voltage across said diodes in the other circuit means.

4. A gyro system according to claim 1 wherein said first and second circuit means include:
   (a) a transformer for coupling signals from each signal source and a transformer for coupling signals to each torquer, and
   (b) means for connecting said semiconductor switching means and said transfer control means to said transformers to provide a direct current balance in said transformers.

5. In a vertical gyro system having a pitch axis torquer and a roll axis torquer for erecting a gyro, a pitch axis sensor and a roll axis sensor responsive to the position of the gyro for causing said torquers to erect the gyro, first circuit means for interconnecting said pitch axis sensor and said roll axis torquer and for interconnecting said roll axis sensor and said pitch axis torquer to cause a precession erection of the gyro, second circuit means for interconnecting said pitch axis sensor and said pitch axis torquer and for interconnecting said roll axis sensor and said roll axis torquer to cause direct erection of the gyro, the improvement comprising:
   (a) said first and second circuit means including semiconductor switching means, and
   (b) electrical biasing means connected to said semiconductor switching means so that when said biasing means is of one potential, a precession erection of the gyro can be effected and when said biasing means is of another potential, a direct erection of the gyro can be effected.

6. A gyro system according to claim 5 wherein:
   (a) said first circuit means includes a plurality of semiconductor diodes which can conduct current to cause a precession erection of the gyro when said biasing means maintains a first potential, and
   (b) said second circuit means includes a plurality of semiconductor diodes which can conduct current to cause a direct erection of the gyro when said biasing means maintains a second potential.

7. A gyro system according to claim 6 wherein one of said first and second circuit means includes zener diodes, each of said zener diodes connected in series with another of said semiconductor diodes to develop a blocking voltage across said semiconductor diodes in the other circuit means.

8. A gyro system according to claim 5 wherein said first and second circuit means include:
   (a) a transformer for coupling signals from each sensor and a transformer for coupling signals to each torquer,
   (b) means for connecting said semiconductor switching means and said electrical biasing means to said transformer to provide a direct current balance in said transformer.

9. A gyro system according to claim 5 wherein said system includes:
   (a) a sensor which generates signals corresponding to the angular relationship between pitch and roll axis gimbals, and
   (b) the last-mentioned sensor replacing said pitch axis sensor during a direct erection mode of the gyro so that said second circuit means interconnects said last-mentioned sensor and said pitch axis torquer during the direct erection mode of the gyro.

10. In a signal transfer system having a plurality of signal sources which generate signals to be utilized by a plurality of signal responsive means; a first circuit means for coupling signals from a first of the sources to a first of the responsive means and for coupling signals from a second of the sources to a second of the responsive means, a second circuit means for coupling signals from the first source to the second responsive means and for coupling signals from a signal source other than the first signal source to the first responsive means, the improvement comprising:
   (a) said first and second circuit means including semiconductor switching means,
   (b) transfer control means connected to said semiconductor switching means to that when the output of said transfer control means is of one character, said first circuit means can couple signals and when the output of said transfer control means is of another character, said second circuit means can couple signals.

11. A signal transfer system according to claim 10 wherein:
(a) said first circuit means includes a plurality of semiconductor diodes which can conduct current when said transfer control means maintains a first potential, and
(b) said circuit includes a plurality of semiconductor diodes which can conduct current when said transfer control means maintains a second potential.

12. A signal transfer system according to claim 2 wherein one of said first and second circuit means includes zener diodes, each of said zener diodes connected in series with another of said semiconductor diodes to develop a blocking voltage across said semiconductor diodes in the other circuit means.

References Cited
UNITED STATES PATENTS

| | | | |
|---|---|---|---|
| 2,567,948 | 9/1951 | Lane | 74—5.42 |
| 2,605,641 | 8/1952 | Barkalow | 74—5.46 |
| 2,875,619 | 3/1959 | Wilhelm et al. | 74—5.47 X |
| 2,896,946 | 6/1961 | Sulmer | 74—5.47 |

FRED C. MATTERN JR., *Primary Examiner.*

J. D. PUFFER, *Assistant Examiner.*